United States Patent [19]

Samuels

[11] Patent Number: 4,774,685

[45] Date of Patent: Sep. 27, 1988

[54] APPROXIMATION SYSTEM

[75] Inventor: Howard R. Samuels, Newton, Mass.

[73] Assignee: Analog Devices, Inc., Norwood, Mass.

[21] Appl. No.: 696,809

[22] Filed: Jan. 31, 1985

[51] Int. Cl.$^4$ .............................................. G06F 1/02
[52] U.S. Cl. .................................................. 364/718
[58] Field of Search ................ 364/718, 719, 721, 852

[56] References Cited

U.S. PATENT DOCUMENTS

| | | | |
|---|---|---|---|
| 3,621,227 | 11/1971 | Tsuda et al. | 364/852 |
| 3,622,770 | 11/1971 | Edelson | 364/852 |
| 3,699,318 | 10/1972 | Underkoffler et al. | 364/719 |
| 4,192,003 | 3/1980 | Brock et al. | 364/852 |
| 4,326,260 | 4/1982 | Gross | 364/718 |
| 4,521,865 | 6/1985 | Winkler et al. | 364/719 |
| 4,593,372 | 6/1986 | Bandai et al. | 364/715 |

OTHER PUBLICATIONS

Cantoni, "Optimal Curve Fitting With Piecewise Linear Functions", *IEEE Trans. on Computers*, vol. C-20, #1, pp. 59–67, Jan. 1971.

Primary Examiner—Gary V. Harkcom
Assistant Examiner—Dale M. Shaw
Attorney, Agent, or Firm—Wolf, Greenfield & Sacks

[57] ABSTRACT

A system for generating a continuous piece-wise linear approximating function that approximately corresponds to a predetermined function over a preselected domain, the approximating function having a selected number of linear segments, the approximating function at the endpoints of the domain falling on the predetermined function. The system first selects an initial error limit, then identifies the points which define the segments. In defining the segments, the system begins at a low endpoint, extends a test segment from the low point to a high endpoint on the predetermined function, and then tests the error between the test segment and the predetermined function at each point. If the error is less than the error limit, the system selects a new higher point on the predetermined function as the new high endpoint, and repeats the operation until the test segment error between it and the predetermined function by at most the error limit. The system then extends the test segment until the error is, at most, the error limit. After determining all but the last segment, the system tests the last segment to determine whether each point is within the selected error of the approximating function. The system then adjusts the error and repeats the procedure until a termination criterion is satisfied.

17 Claims, 11 Drawing Sheets

LAST SEGMENT TEST

APPROXIMATION SYSTEM

BACKGROUND OF THE INVENTION

1. Field of the Invention

The invention relates generally to methods and systems for curve-fitting, that is, for approximating a predetermined function by a function having selected characteristics. More specifically, the invention relates to methods and systems for locating a piecewise continuous function represented by a predetermined number of linear segments which approximately corresponds to a predetermined function having monotonically increasing or decreasing characteristics. The invention finds particular utility in connection with the design of compensating input networks for electronic circuits for use with circuit elements or transducers which have nonlinear relationships between the physical phenomena being sensed and the electrical output. An example of such a transducer is a thermocouple, which has monotonically increasing, but non-linear, voltage output as a function of temperature. When used in connection with a thermocouple, the endpoints and the slopes of the linear segments that are found to approximate the thermocouple's voltage-temperature curves are useful in designing resistor networks to be used in amplifier circuits for the thermocouples.

2. Description of the Prior Art

Several systems have been developed for generating mathematical expressions which approximate curves of, for example, scientific data that is graphed as one or more dependent variables which are functions of one or more independent variables. For example, systems using the "least squares" method, as well as others, can find a polynomial expression, or power series, in which a dependent variable can be expressed as a polynomial expression in an independent variable. By inserting into the polynomial expression a value for the independent variable, one can readily determine the value of the dependent variable as a function of the selected value of the independent variable at each point in the domain of interest of the independent variable. Since the polynomial expression is itself an approximation of the observed data, the value determined by use of the expression is an approximation, although often a good one, of the data which had been used to generate the polynomial expression.

The least squares method may be constrained to generate a linear approximation to the observed data, but if the linear approximation is taken over the entire domain, the error, that is, the difference between the data and the approximation, is often quite large. Instead of generating a single approximation over the entire domain, a system can divide the domain into a selected number of regions, and use the least squares method on each region. Even if this technique develops acceptable approximations within each region, two significant problems remain: first, the resulting approximation is, most likely, not continuous across the entire domain, and, second, the approximation most likely does not, at the ends of the domain, equal the data. Both of these are desirable in the development of compensation networks for electronic circuitry. For example, it may be desirable to design an amplifier circuit for use with a thermocouple over a selected temperature range having an input network to compensate for the fact that the thermocouple's voltage output as a function of temperature is not linear. The operating characteristics of most thermocouples are well known, and have been approximated by a power series of voltage output as a function of temperature. The power series functions are fairly complex, and the development of a compensating network from such functions is quite difficult. However, if the operating characteristics are approximated by a linear, or at least a continuous piecewise linear, expression over the entire desired operating range, designing a compensating network from resistors would be a simple matter. Having the approximation fall on the observed data at the endpoints of the domain is desirable in connection with performing gain adjustments on the amplifier circuit.

Instead of using linear least squares approximations, approximations can be generated by dividing the domain into a selected number of regions and forming a linear approximation in each region as the line between the endpoints of the data in the region. In such an approximation, the function is continuous, but since all of the endpoints of the linear segments which approximate the function are constrained to fall on the data being approximated, the error between the linear approximation and the function being unacceptably large at at least some points of the domain.

SUMMARY OF THE INVENTION

The invention provides a new and improved method and system for generating a continuous piece-wise linear function which approximately corresponds to a predetermined monotonically increasing or decreasing nonlinear function, so that the approximating function generated by means of the invention has a minimum of error, in relation to the number of linear segments used in the generated function, from the predetermined function over the function's entire domain of interest.

In brief summary, the invention iteratively generates a piece-wise linear function having a preselected number of linear segments which approximates the predetermined function to within a predetermined error band along the predetermined function's domain. If, with the selected error band, the system is able to find the selected number of linear segments which approximates the function, the system reduces the error band and repeats the procedure.

Initially, the system divides the domain of the function into a selected number of divisions, determines the value of the predetermined function at each of the endpoints of the divisions, and selects an initial maximum error defining the initial error band. During each iteration, the system first locates the endpoints of the segments except for the last or high-order segment. During this process, the system iteratively determines the error between the predetermined function and line segments drawn from a low point to the function at the endpoint of each successive division. If the system is in the first segment, the low point of the segment is the function at the low end of the domain; otherwise, the low point of the segment is the high end of the previously-determined segment. This process continues until the error is, at most, the selected maximum error. When a line segment is located having the maximum error, the system then extends the line segment, division by division, maintaining a constant slope, until the error between the segment and the function is again at most the selected maximum error, which point corresponds to the high endpoint of this segment and the low endpoint of the next segment.

After all but the last of the preselected number of segments have been located, the system checks at each division endpoint whether a line segment drawn from the high endpoint of the next to last segment to the point of the predetermined function at the high end of the domain is within the selected error. If it does, the selected maximum error is deemed "loose", otherwise the selected maximum error is deemed "tight". If the maximum error is loose, it is reduced and a subsequent iteration performed. If the error is tight, it is increased and a subsequent iteration performed.

When the system has, in consecutive iterations, located errors which are loose and tight, it begins a binary search procedure in which it uses as the selected error the average of the tight and loose errors. In the binary search, the system iteratively locates the line segments as before. At the end of each iteration the system determines whether the error it was using was tight or loose and uses the error in the formulation of a new error value. This continues until a selected termination criterion is met, in response to which the iterations cease and the line segments determined represent the required approximation.

BRIEF DESCRIPTION OF THE DRAWINGS

The invention is pointed out with particularity in the appended claims. The above and further advantages of the invention will be apparent on reference to the following Detailed Description of a Preferred Embodiment when taken in connection with the accompanying drawings in which FIGS. 1, 2, 3A–3D, 4, 5A, 5B, 6 and 7 comprise flow diagrams detailing the operation of a system constructed in accordance with the invention.

DETAILED DESCRIPTION OF A PREFERRED EMBODIMENT

Figure 1:
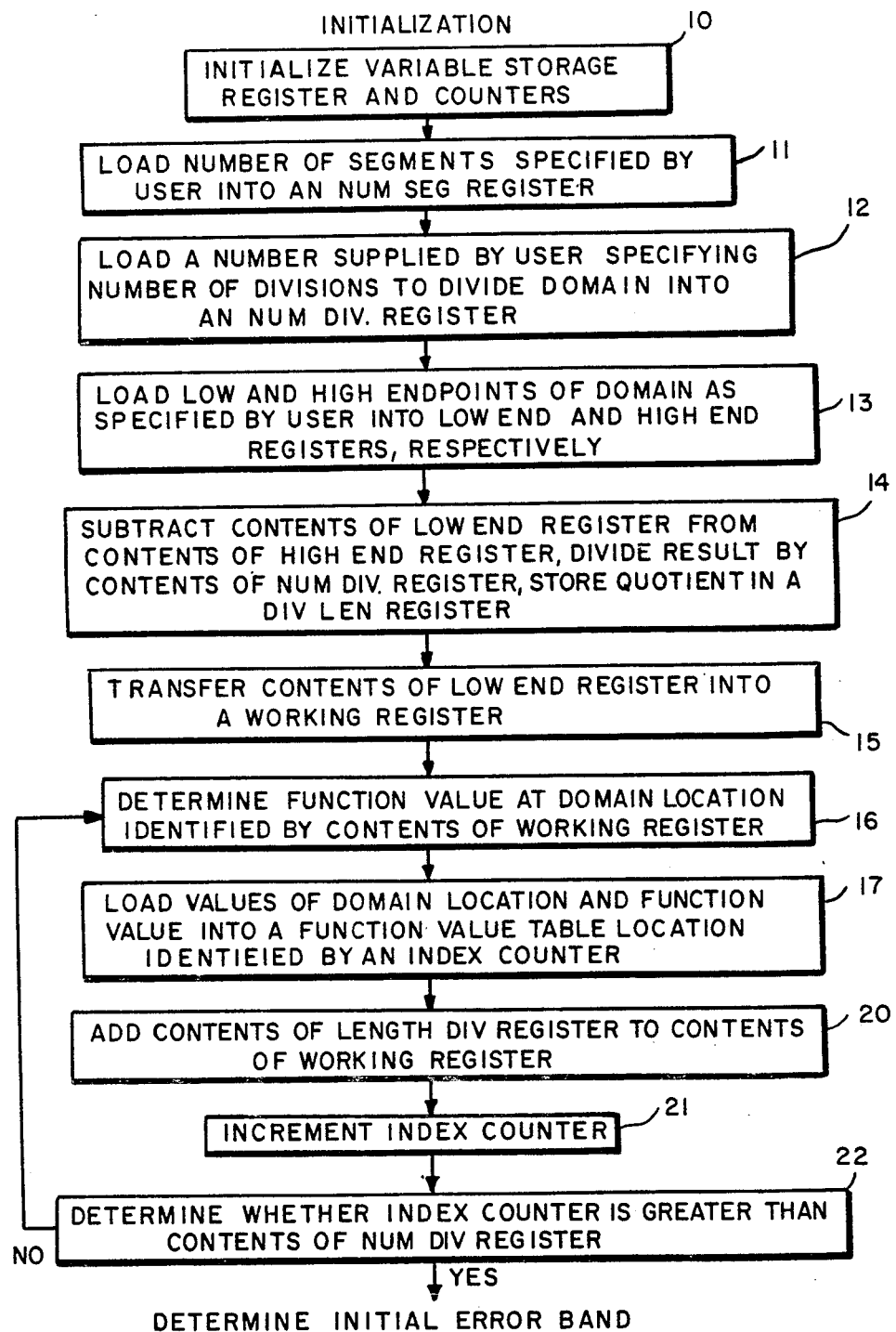

With reference to the Figures, the system uses the sequence in FIG. 1 as an initialization procedure to divide the domain of interest into a selected number of divisions, as provided by an operator, and to determine the value of the predetermined function at the endpoints of the divisions. In this sequence, the system uses the following data structures:

A NUM SEG register, when loaded by an operator, identifies the number of linear segments which are to comprise the linear function identified by the system. In one specific embodiment of the invention, the number of segments is selected to be five.

A NUM DIV register, when loaded by an operator, identifies the number of divisions into which the domain of the predetermined function is to be divided. In one specific embodiment, the number of divisions is selected to be one hundred.

A LOW END register and a HIGH END register, when loaded by an operator, identify, respectively, the values of the low and high points in the domain of the predetermined function. For example, if the system is used to determine an approximating function to be used in connection with a thermocouple, the registers contain the low and high temperatures over which the thermocouple will be operated.

A DIV LENGTH register identifies the length in the domain of each division. For example, if the LOW END register contains the value "100" and the HIGH END register contains the value "350", each representing degrees Celsius, and the NUM DIV register contains the value "100", the DIV LENGTH register will store the value "2.5", also representing degrees Celsius.

A function value table stores the values of the predetermined function at the low endpoint in the domain, at the endpoint of each divison, and at the high endpoint in the domain at successive locations in the table.

An index counter is used to identify a divison number.

With reference to FIG. 1, after initializing the above-identified data structures (step 10), the system loads the number of segments specified by the operator into the NUM SEG register (step 11). This value is used in the sequence beginning on FIG. 3A of determining the piece-wise linear segments which approximate the predetermined function. The number of divisions into which the domain is to be divided is provided by the operator and stored in the NUM DIV register (step 12), and the low and high endpoints of the domain, also provided by the operator, is loaded into the respective LOW END and HIGH END registers (step 13). The length of each division, that is, the quotient found by dividing the difference between the values stored in the HIGH END and LOW END registers by the number of divisions as stored in the NUM DIV register, is determined and stored in the DIV LENGTH register (step 14). The values of the predetermined function at the endpoint of each division can then be calculated (steps 15, 16, 17, 20, 21 and 22) and the values loaded into the function value table.

Several procedures can be followed for calculating the values of the predetermined function. The procedure set forth in FIG. 1 is an iterative procedure in which the low endpoint of the domain of the predetermined function is first copied from the LOW END register into a working register (step 15). The working register will, during this and succeeding iterations, contain the domain value for which the system determines the predetermined function value. The value of the predetermined function is determined for the domain value in the working register (step 16), which is loaded into the function table at the location identified by the index counter (step 17). At this time, the value of the index counter is zero, and so the value of the predetermined function at the low end of the domain is loaded into the zeroth location in the function value table. The contents of the DIV LENGTH register are then added to the contents of the working register to identify the actual location in the domain of the next endpoint (step 20) the function value for which is to be determined. The index counter is incremented (step 21) and the value of the index register is compared to the contents of the NUM DIV register (step 22) to determine whether the function values at the endpoints of all of the divisions have been calculated. If they have, the system proceeds to the sequence beginning on FIG. 2; otherwise, the system returns to step 16 to calculate the value of the predetermined function at the endpoint of the next division.

Figures 2, 3A:
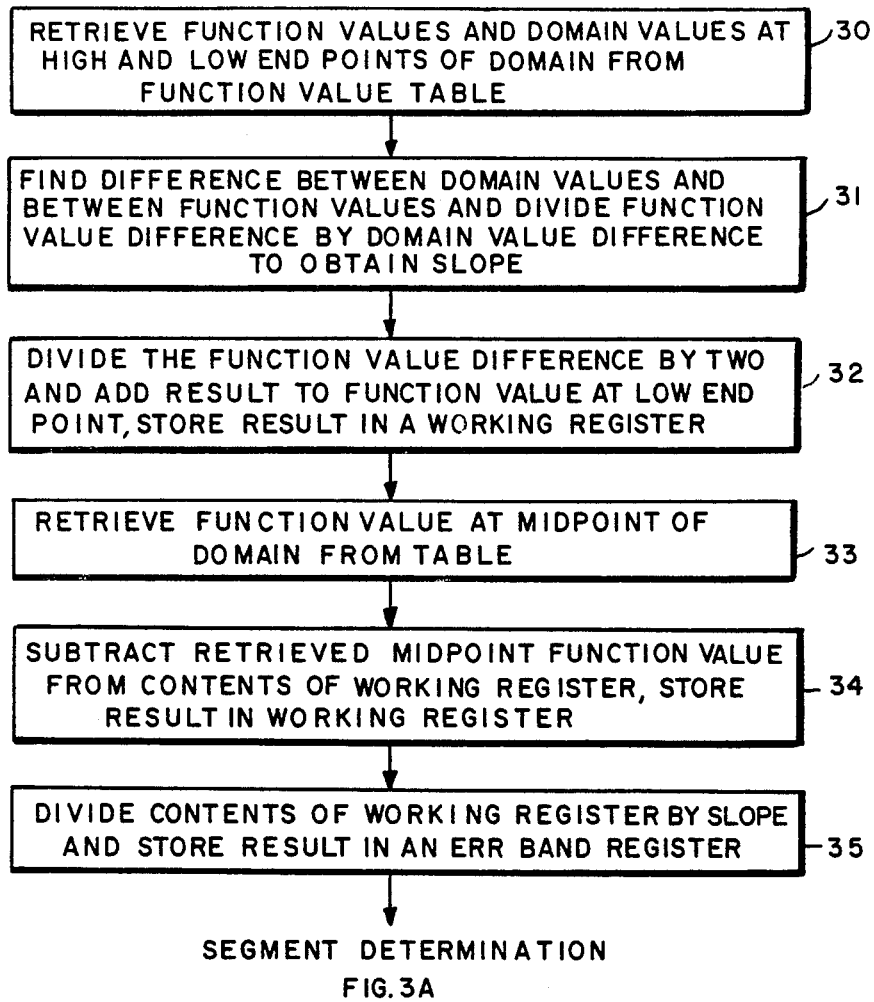
Figure 3A:
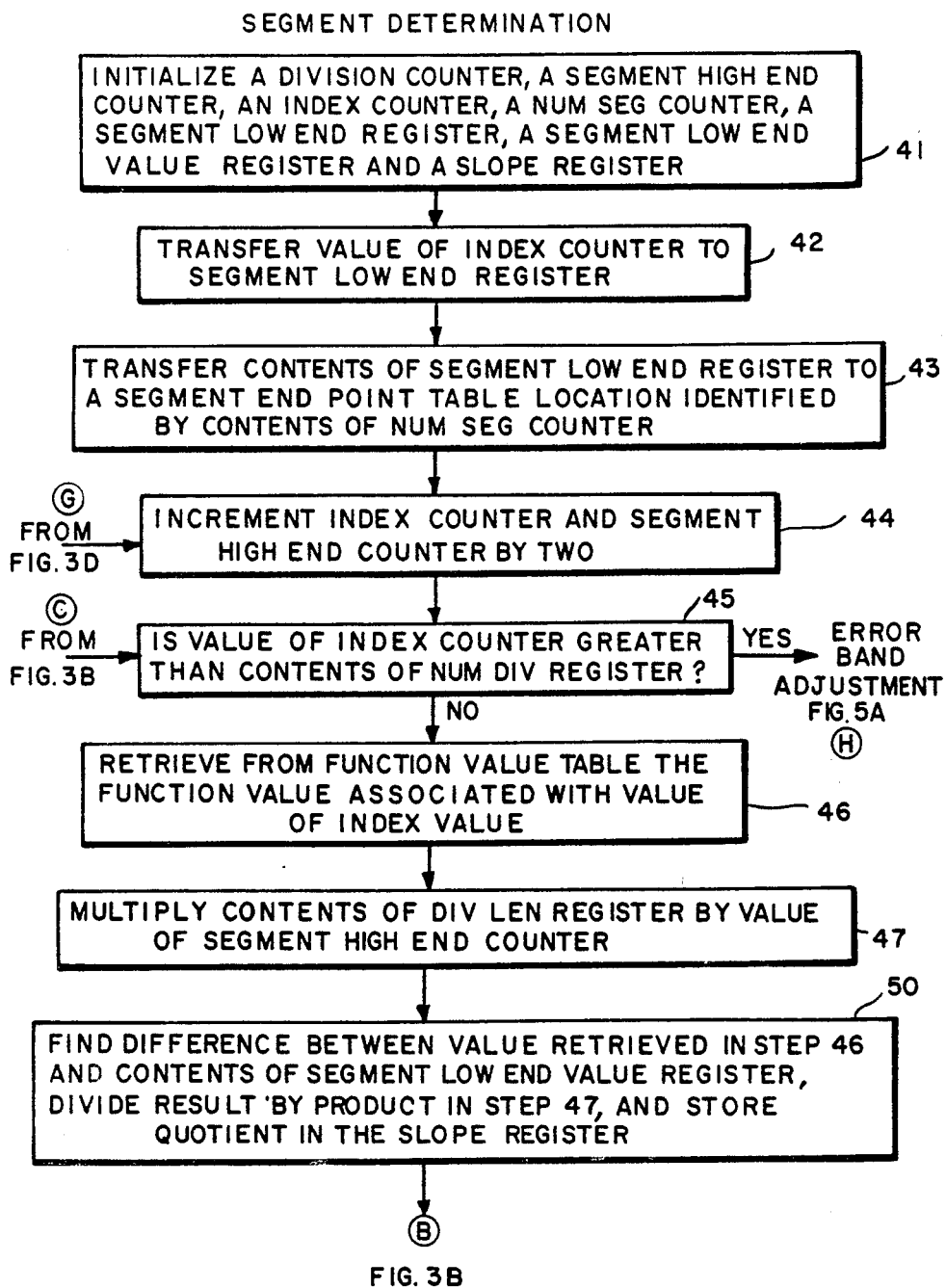
Figure 3B:
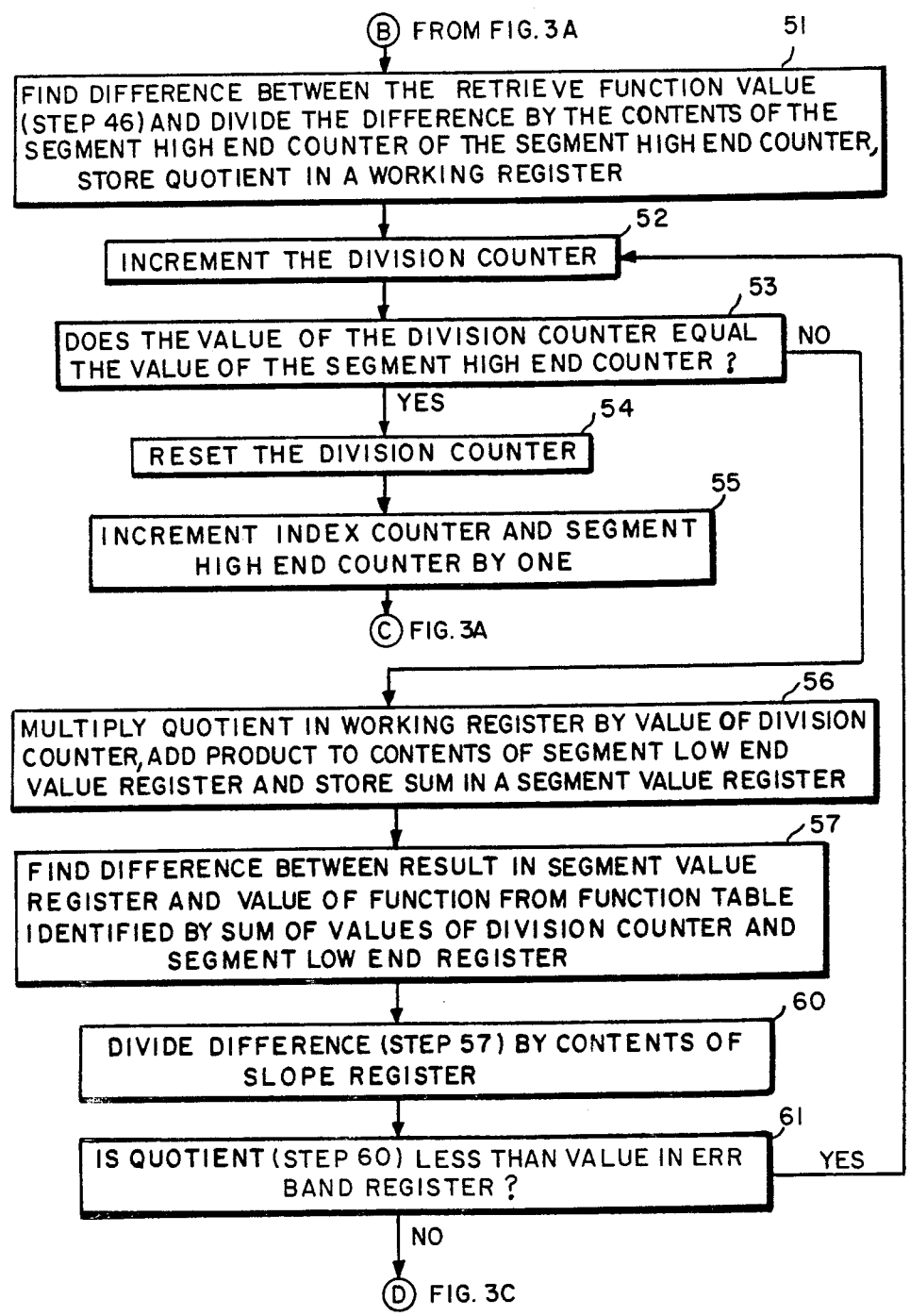
Figure 3C:
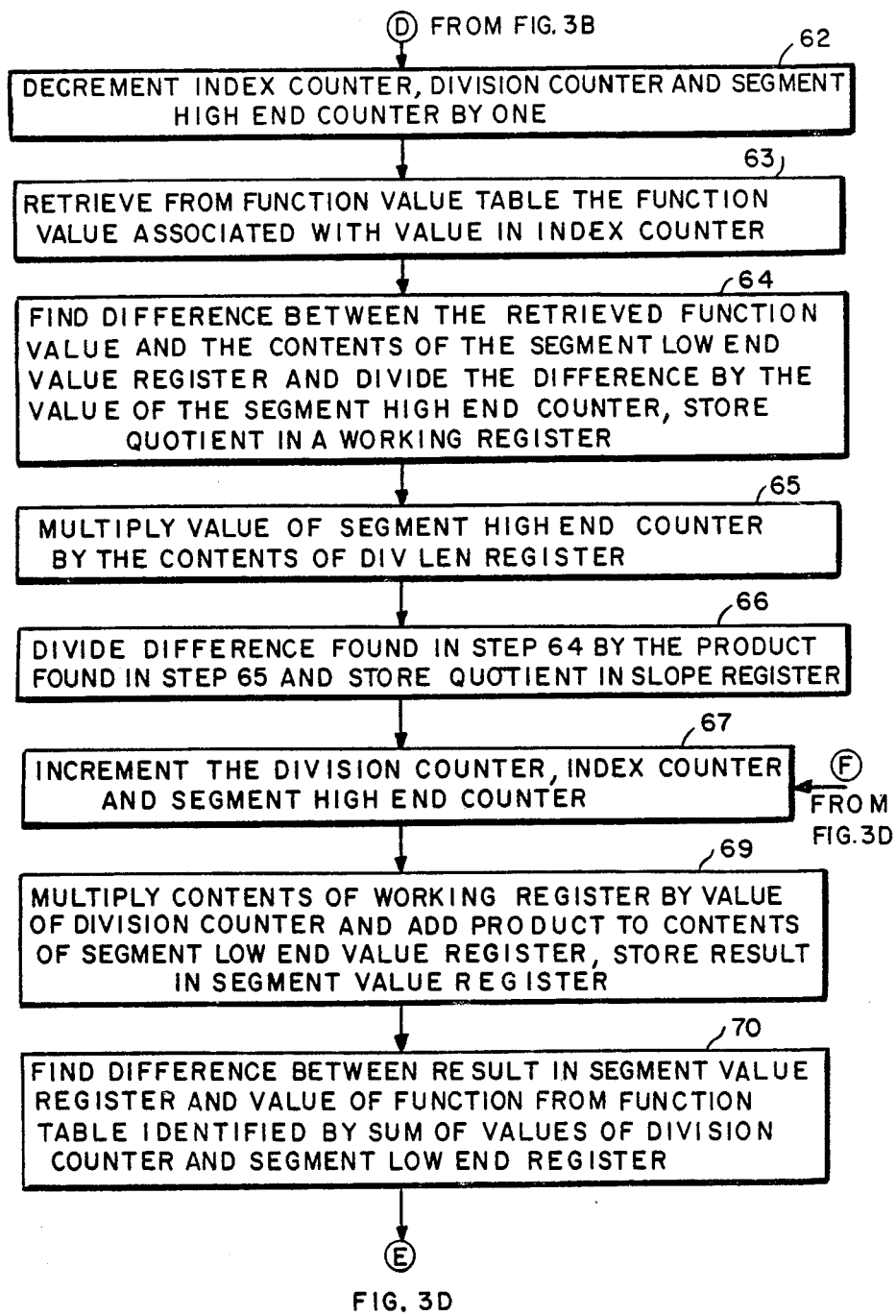

After the values of the predetermined function have been calculated at the endpoints of the divisons and have been loaded into the respective locations of the function value table, the system uses the sequence depicted in FIG. 2 to calculate an initial error value. In brief, in one embodiment of the invention, the system determines the difference between the function value at the midpoint of the domain and the value at that point of a single linear segment between the endpoints of the domain, and divides the result by the slope of the segment, the result being an initial error value. The dimension, or unit, of the initial error thus corresponds to the dimension or unit of the domain of the function being approximated. For example, if the approximation is for data expressed in volts as a function of degrees Celsius, to use a thermocouple as an example, the units of the slope of the segment are volts per degree Celsius, and so the units of the initial error value are degrees Celsius (that is, the dimension of volts, for the difference between the value of the linear segment at the midpoint of the domain and the value of the observed data at the same point, divided by the slope dimensioned in volts per degrees Celsius, resulting in the dimensions of the initial error value being degrees Celsius). As will be apparent from the discussion of FIGS. 3A et seq, the actual initial error value that is calculated, and the procedure used to determine the initial error value, is arbitrary, and a number of procedures can be used.

With reference to FIG. 2, the system first retrieves the domain values and the function values at the high and low endpoints of the domain of interest from the function value table (step 30), and finds the difference between the two values (step 31). The system also finds the difference between the domain values at the high and low endpoints of the domain. The system then divides the function value difference determined in step 31 by two, and adds the quotient to the function value at the low endpoint (step 32). The sum constitutes the value at the midpoint of the domain of a linear segment between the points on the predetermined function at the endpoints of the domain. The system then retrieves the function value at the midpoint of the domain from the function value table (step 33), and finds the difference between the retrieved value and the sum calculated in step 32 (step 34). The system then (step 35) divides the difference calculated in step 34 by the slope from step 32, and loads the quotient into an ERR BAND register, which is used to store the error value.

After the initial error band is determined (FIG. 2), the system proceeds to the sequence beginning on FIG. 3A to determine the piece-wise linear function that is most nearly approximate to the predetermined function over the domain. In brief, in this sequence, the system iteratively determines the endpoints of the linear segments beginning with a first segment starting at the low end of the domain. After the system determines the high endpoint of the next to last segment, the last segment is considered as connecting the high endpoint of the next to last segment to the function value at the high endpoint of the domain, and the system operates in accordance with the sequence depicted in FIG. 4 to determine whether the difference between the linear segment value and the predetermined function value at each of the division endpoints is within the error specified in the ERR BAND register. The system then adjusts the error band as depicted in FIGS. 5A and 5B and returns to the beginning of FIG. 3A to determine another piece-wise linear function. The sequence is repeated until the system determines that, in two consecutive sequences, it can, in one sequence, identify a piece-wise linear function within the specified error, and, in another sequence, not identify such a function.

At that point, the system begins a binary search operation (FIG. 6), which is similar to the sequences depicted in FIGS. 3A through 5B, except for the procedure for determining and using the error. Specifically, if, during each function-determination operation, the system is unable to calculate a function the error band is deemed "tight", and if the system is able to calculate a function, the error band is deemed "loose". During the binary search, the system averages the tight and loose error bands as the error band for the next binary search operation. The procedure continues until one of several termination criteria (FIG. 7) are satisfied.

In the function determination sequence, the system uses the values in the NUM SEG register, the function value table and the index counter described above, and also uses a NUM SEG counter to identify the number of piece-wise linear segments that have been located. A SEGMENT LOW END register identifies the division number of the low end in the domain of a current segment and a SEGMENT LOW END VALUE register receives the value of the predetermined function at the low end of the segment. A segment end point table identifies the division numbers and the values of the end points of the segments. A SEGMENT HIGH END counter identifies the number of divisions from the low end of the segment to the high end during the determination of each segment. A DIVISION counter is used to count divisions in determining whether the segment is within the required error band.

With reference to FIG. 3A, the system first initializes the above-noted data structures (step 41), copies the value of the index counter, which, during the first iteration, has the value "zero", into a segment low end register (step 42), and copies that value into a location in the segment end point table identified by the contents of the NUM SEG counter (step 43). The segment low end register and the low-order location in the segment end point table thus identify the division number of the first segment as being the low end of the first division, that is, the low end of the domain. The system also copies the value of the predetermined function at the low end of the domain from the function value table into the segment end point table.

The index counter and the segment high end counter are then incremented by two to point to the high endpoint of the second division (step 44), the segment between the low endpoint specified by the contents of the segment low end register and the segment low end value register and the point on the predetermined function identified by the index counter comprising a test segment. The value of the index counter is tested (step 45) to determine whether it is greater than the contents of the NUM DIV register. In the first iteration, it is not, but if it were, the test segment would at a point be beyond the high endpoint of the domain, and it would proceed to the error band adjustment sequence in FIG. 5A. Initially, however, the system sequences to step 46 to determine the high endpoint of the first test segment.

In steps 46, 47, 50 through 53, 56, 57, 60 and 61 (FIGS. 3A and 3B), the system tests whether, for the test segment between the low endpoint as specified in the SEGMENT LOW END and SEGMENT LOW END VALUE registers, and the point on the predetermined function identified by the index counter, the error between the segment and the predetermined function at the endpoint of each division is less than the error value specified in the ERR BAND register. The system first retrieves the function value associated with the value of the index counter from the function value table (step 46). To determine the slope of the test segment, the system first determines the length, in the domain, between low and high ends of the test segment. It multiplies the contents of the DIV LEN division length register by the value of the segment high end counter (step 47). The difference between the value of the high end of the segment and the contents of the segment low end value register is determined, the difference is then divided by the length determined in step 47, and the quotient, which is the slope of the test segment, is stored in a slope register (step 50).

The system then determines the incremental increase in value of the test segment across each division. The system first finds the difference between that value and the value of the low end of the segment in the segment low end value register, and divides the difference by the contents of the segment high end counter (step 51), which identifies the number of divisions in the segment being tested. Since the test segment is linear, the quotient corresponds to the incremental increase, from the low end of the segment, in the value of the linear segment across each division.

The division counter, which currently has a value zero, is then incremented (step 52) to identify the endpoint of the first division. The division counter is used to identify the division whose endpoint is currently being tested for error. Thus, if the value of the division counter equals the segment high end counter, all of the divisions in the test segment have been tested. However, if the value of the division counter is less than the value of the segment high end counter (step 53), the system sequences to step 56 to determine whether the error between the value of the predetermined function and the test segment at that point is less than the required error. Specifically, the system multiplies the quotient determined in step 51 by the value of the division counter and adds the product to the contents of the segment low end value register (step 56), the result being the value of the linear test segment at that point. The system then finds the difference between that value and the value of the predetermined function at that point (step 57). The difference is then divided by the contents of the slope register (step 60) and the quotient is compared to the contents of the ERR BAND register (step 61). If the difference is less, the system returns to step 52 to increment the division counter. If the value of the division counter is equal to the value of the segment high end counter (step 53), the division counter is reset (step 54), the index counter and segment high end counter are incremented by one to point to the next (third) division endpoint, and the procedure is repeated from step 45.

Steps 45 through 61 thus determine whether the error between a linear segment drawn between a low point and a point on the predetermined function is less than the predetermined error in the ERR BAND register. If, at some point, the error is not less than the predetermined error, in step 61 the system sequences to step 62.

In steps 62 through 72, the system decrements the index and segment high end counters by one to point to the last division to whose endpoint a linear test segment was within the required error of the predetermined function. The system, beginning with step 62, essentially extends that test segment division by division and tests, at each extension, to determine a point at which the error again exceeds the error specified in the ERR BAND register.

Specifically, in step 62, the system decrements the index counter, the division counter and the segment high end counter by one and retrieves the function value from the function value table that corresponds to the value in the index counter (step 63). As in step 51 above, the system in step 64 finds the incremental change in the function value between division endpoints. Since the test segment is linear, the incremental change is constant across the segment. The slope of the test segment is determined (steps 65 and 66) in the same way as steps 47 and 50, above. The division, index and segment high end counters are then incremented (step 67) to point to the endpoint of the next division. The value of the division counter is then multiplied (step 69) by the increment determined in step 64 and the product is added to the contents of the segment low end value register to determine the value of the linear segment at this point, the result being stored in a segment value register. The system determines the difference between the value stored in the segment value register (step 71), divides the difference by the contents of the slope register (step 71) and compares the result to the error in the ERR BAND register (step 72). If the result determined in step 71 is less than the error in the ERR BAND register, the system returns to step 67 to extend the linear segment another division and repeat the sequence.

If the difference in step 72 is not less than the contents of the ERR BAND register, the system determines the value of the endpoint of the segment, which is the value of the segment at the previous division. Specifically, the system sequences to step 73 to decrement the division counter, and then it multiplies the division increment value determined in step 64 by the value of the division counter, adds the product to the contents of the segment low end value register, and stores the sum in the segment low end value register as the new low end value of the next segment (step 74).

The system then performs several other operations to prepare to determine the next segment. Specifically, the system sequences to step 75 in which it increments the NUM SEG counter. In step 76, the system decrements the index counter and copies its value into the segment low end register, thereby identifying the division endpoint corresponding to the low endpoint of the next segment. In step 77, the system copies the contents of the segment low end register and the segment low end value register into the location of the segment end point table identified by the value of the NUM SEG counter, thereby retaining the location of the endpoint of the segment. The system then resets the division and segment high end counters (step 78) and compares the value of the NUM SEG counter to the contents of the NUM SEG register to determine if the system has located all but the last segment (step 79). If the value of the NUM SEG counter is less than the contents of the NUM SEG register, the system returns to step 44 (FIG. 3A) to determine another segment, otherwise, the system steps to the sequence on FIG. 4 to perform the last segment test, that is, to determine whether, at each division endpoint, a segment from the high end of the next-to-last segment to the high endpoint of the domain, the error is less than the contents of the ERR BAND register.

Figures 3D, 4:
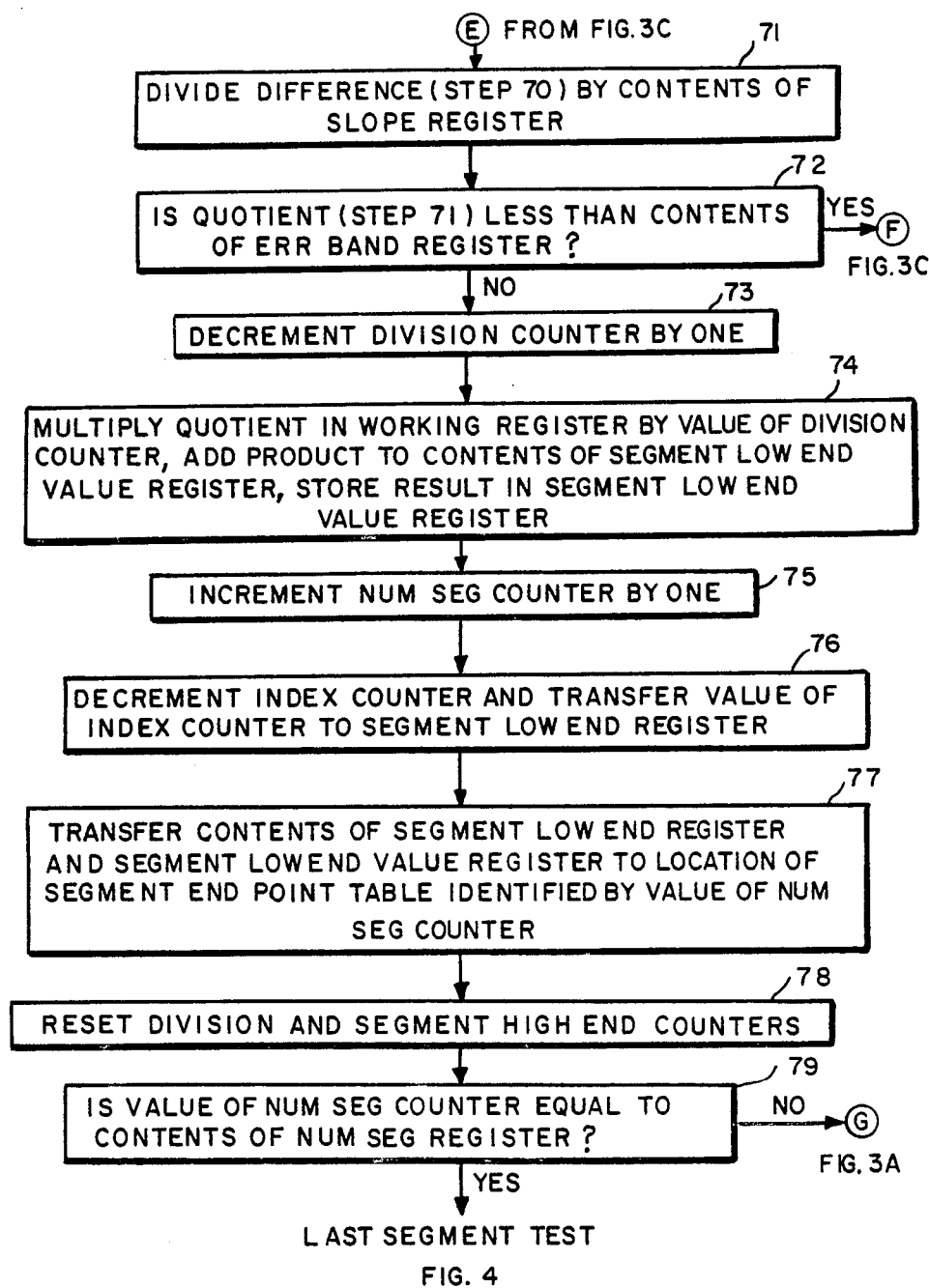
Figure 4:
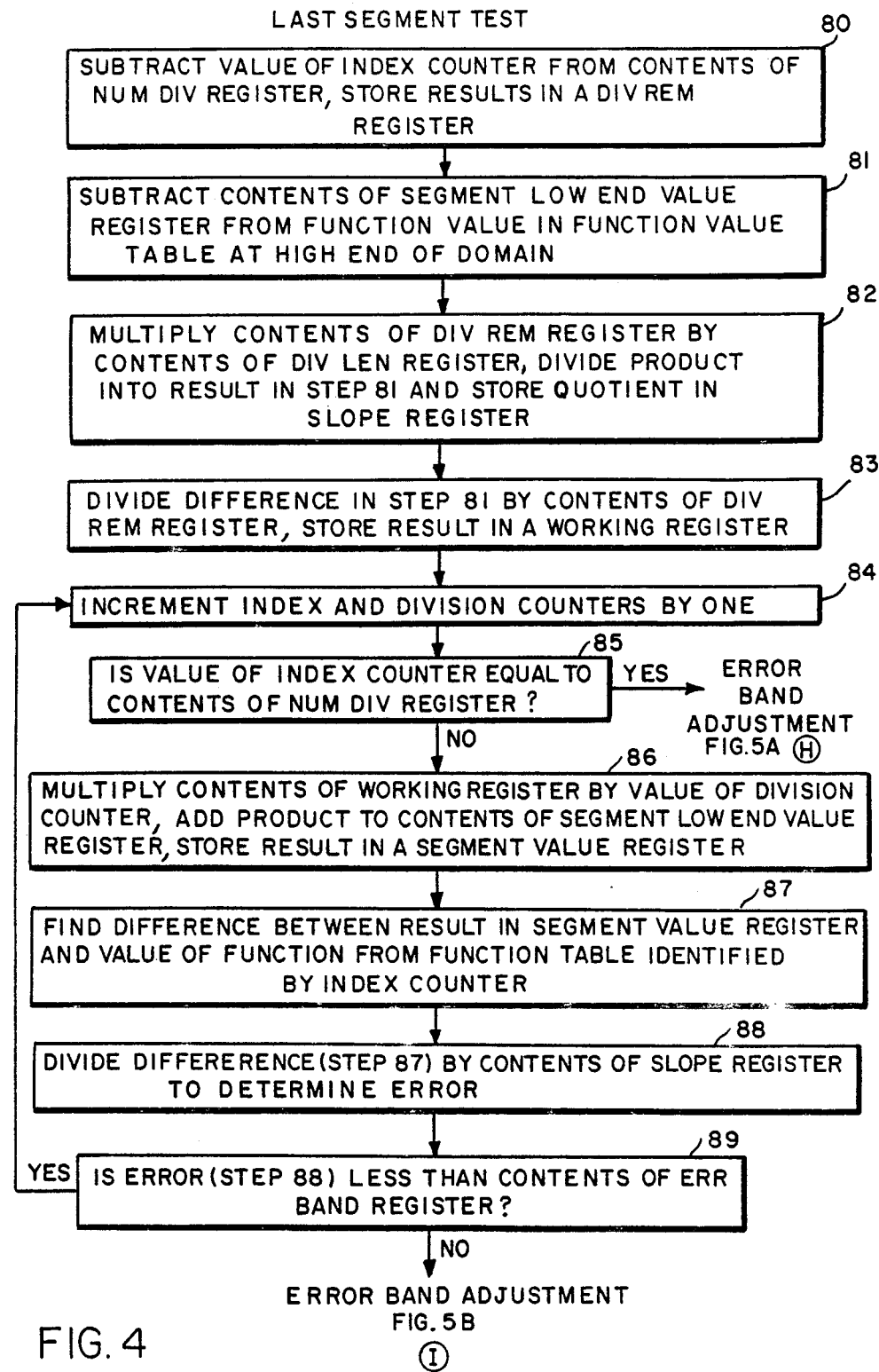
Figure 5A:
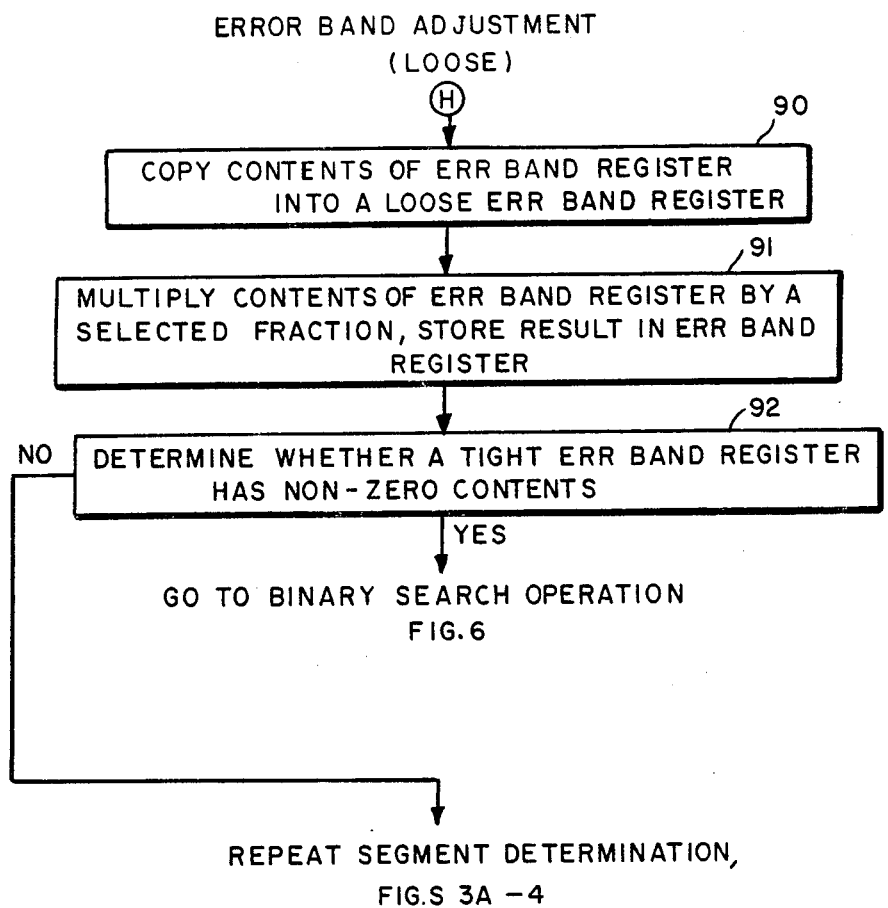
Figure 5B:
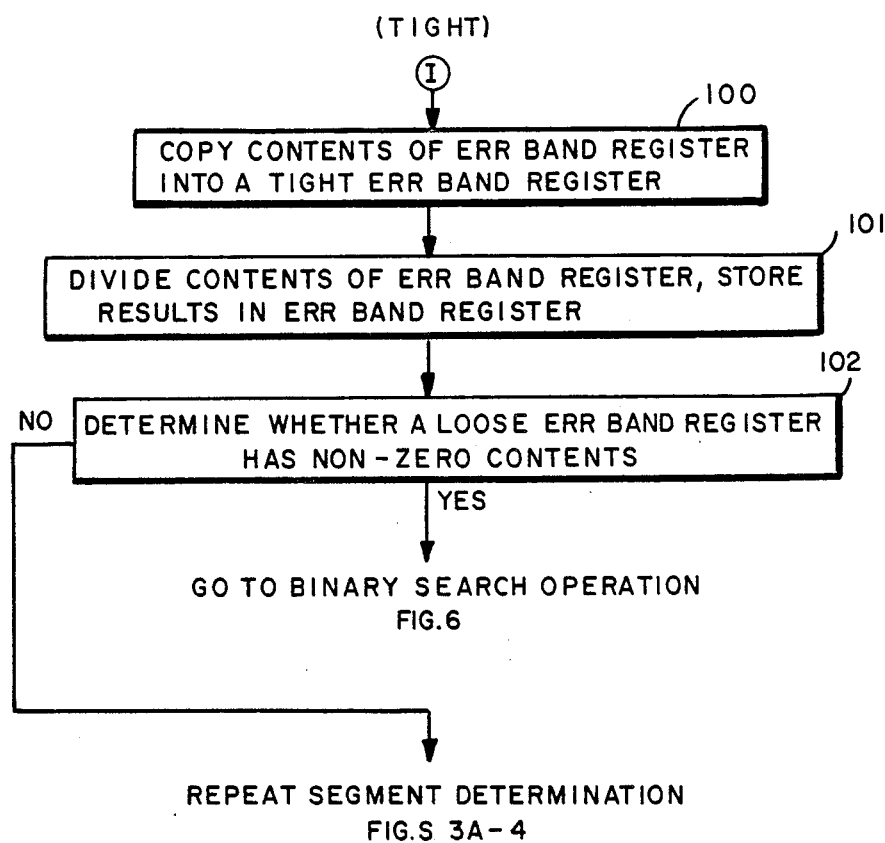

With reference to FIG. 4, after the system has located the high endpoint of the next to last segment, the system first determines the last segment's slope and incremental difference in the last segment's value across each division, (steps 80 through 83) and then tests each division endpoint to determine whether the error between the segment value and the predetermined function value at each division endpoint is less than the error specified in the ERR BAND register (steps 84 through 89).

The system first finds the number of divisions in the last test segment by subtracting the value of the index counter, which now identifies the divison number of the high end of the next-to-last segment, from the contents of the NUM DIV register, which stores the total number of divisions, the result being stored in DIV REM (divisions remaining) register (step 80). The system (step 81) finds the difference in value between the high and low end of the last segment, then multiplies the contents of the DIV REM register by the contents of the DIV LEN register (step 82) to determine the length in the domain traversed by the last test segment, divides the result into the difference in function values determined in step 81, and stores the result, which is the slope of the segment, in the slope register. The system then divides the difference determined in step 81 by the number of divisions in the last segment, the quotient representing the incremental change in the value of the last segment across each division.

Beginning with step 84, the system tests the value of the linear segment at each division endpoint against the value of the predetermined function at that point. The system first increments the index and division counters (step 84) and determines whether the value of the index counter is equal to the contents of the NUM DIV register (step 85). If they are equal, the system is at the high endpoint of the domain; it has tested all of the points in the last segment and exits to FIG. 5A. If they are not equal, the system multiplies the incremental value determined in step 83 by the value of the division counter and adds the product to the contents of the segment low end value register, the result being the value of the linear segment at that point (step 86). The system then (step 87) subtracts the result found in step 86 from the value of the predetermined function at that point from the function value table and divides the difference by the contents of the slope register (step 88). If the result is less than the error specified in the ERR BAND register, the system returns to step 84 to test the error at the endpoint of the next division (step 89); otherwise, the system proceeds to the sequence depicted on FIG. 5B to adjust the value of the ERR BAND register.

If the system steps through all of the divisions in the last segment, the error band is deemed "loose", and the system exits the sequence depicted in FIG. 4 from step 85, and proceeds to the sequence depicted on FIG. 5A to reduce the error. If, however, at one division endpoint, the result determined in step 88 is greater than the contents of the ERR BAND register, the error band is deemed "tight", and the system exits the sequence depicted in FIG. 4 at step 89, and proceeds to the sequence depicted on FIG. 5B to reduce the error. The system normally returns to step 41 of FIG. 3A to locate linear segments with the new error value in the ERR BAND register. If, however, in two consecutive passes, the error is "loose" and "tight", the system steps to the sequence depicted on FIG. 6 to perform a binary search operation using the loose and tight errors.

Figure 6:
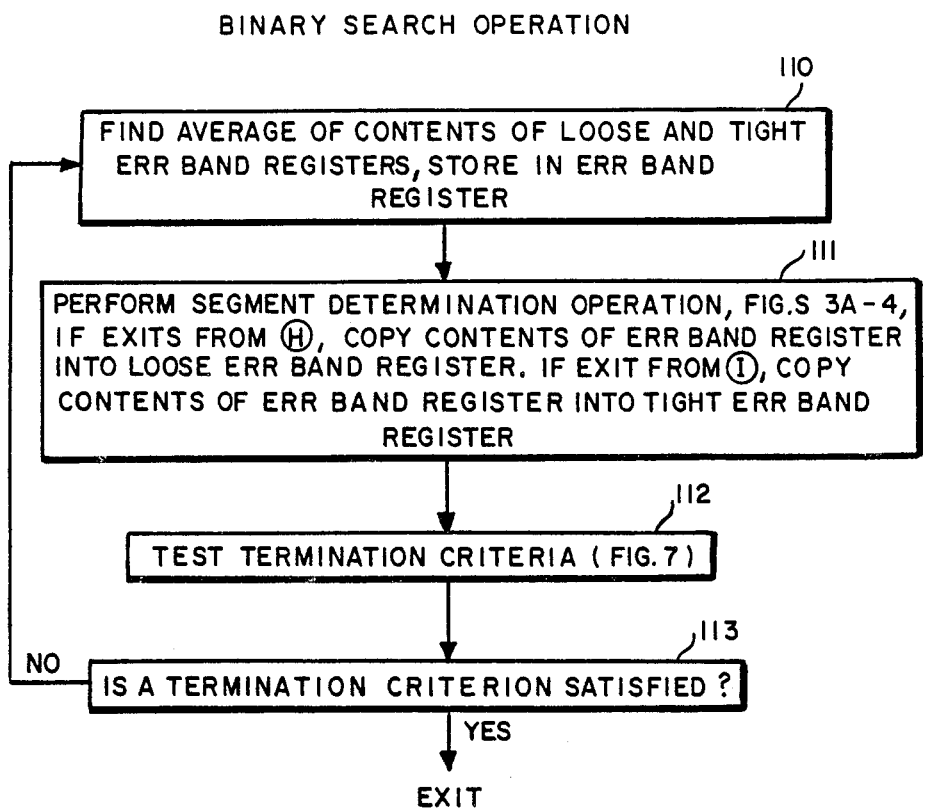

With reference to FIG. 5A, if the system, in step 85 (FIG. 4) determines that at each division endpoint the difference between the value of the last segment and the value of the predetermined function, divided by the slope, is less than the contents of the ERR BAND register at all points in the last segment, the system copies the contents of the ERR BAND register into a LOOSE ERR BAND register (step 90). The system may also copy the contents of the segment end point table into a loose segment table, which can be used to identify the segments on termination. The contents of the ERR BAND register are multiplied by a predetermined fraction to reduce the error (step 91). In one specific embodiment, the fraction is 7/10. The system checks a TIGHT ERR BAND register (step 92) to determine if it has a non-zero content. If it does, the preceding segment-generation iteration used a tight error band, and the system steps to the binary search operation (FIG. 6). If it does not, the system repeats the segment determination and test sequences, FIGS. 3A through 4.

With reference to FIG. 5B, if the system, in step 89 (FIG. 4) determines that, at one division endpoint, the difference between the value of the last segment and the value of the predetermined function, divided by the slope, at some point in the last segment is greater than the contents of the ERR BAND register, the system performs a sequence of steps 100-102 which are similar to steps 90-92, except that the system copies the contents of the ERR BAND register into a TIGHT ERR BAND register (step 100) and tests the contents of the LOOSE ERR BAND register (step 102) to determine whether it should step to the binary search operation.

With reference to FIG. 6, in the binary search operation, the system uses as the error for the ERR BAND register the average of the contents of the TIGHT ERR BAND and LOOSE ERR BAND registers (step 10). The system repeats the segment determination and test operations depicted on FIGS. 3A through 4 using the average in the ERR BAND register (step 111). If the system finds segments which are within the error specified in the ERR BAND register of the predetermined function, the system copies the contents of the ERR BAND register into the LOOSE ERR BAND register. On the other hand, if the system does not find such segments, it copies the contents of the ERR BAND register into the TIGHT ERR BAND register.

Figure 7:
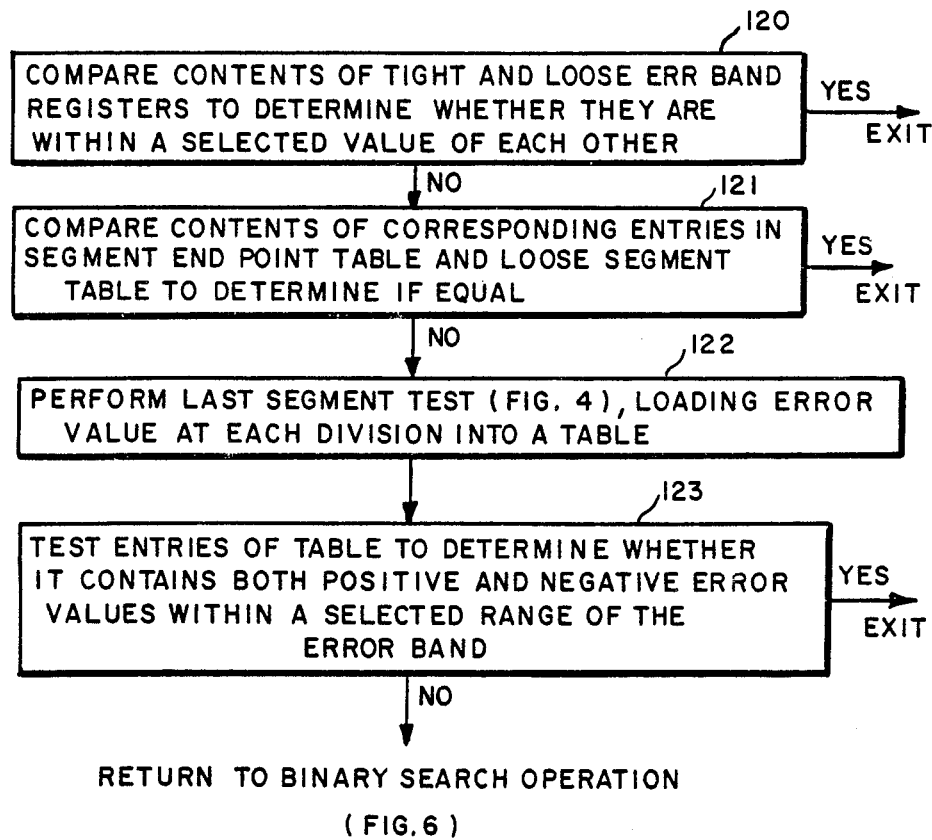

The system then tests various termination criteria, such as those depicted in FIG. 7 (step 112). If a termination criterion is satisfied (step 113) the system exits, with the segments identified by the contents of the loose segment table identifying the segments. Otherwise, the system returns to step 110 to continue the binary search operation.

One specific embodiment of the invention uses three termination criteria and, if any one of them is satisfied, the iterations cease. In one termination criterion, the system determines whether the contents of the TIGHT and LOOSE ERR BAND registers are within a selected value or percentage of each other (step 120). If not, the system compares the contents of the loose segment table and segment end point table to determine if the contents of corresponding locations are equal (step 121). If they are, the segments identified during two successive passes of the binary search operation are the same, and the system exits. In the last termination criterion, the system checks to make sure that, in the last segment, the error is both positive and negative throughout the segment, and that it is within a selected range of the error value in the ERR BAND register (steps 122 and 123). Thus, if the error in the last segment is both positive and negative, but not sufficiently positive and negative to be within the required range, the termination criterion is not met. This criterion essentially ensures that function being approximated falls on both sides of the last segment and that the error between the last segment and the function is sufficiently great on both sides of the segment. If so, the error is deemed acceptable.

If the system exits using the criterion of step 120, the segment end points are in the loose segment table, and otherwise they are in the segment end point table.

It is apparent to those skilled in the art how to use the segment information to determine resistor compensation networks for amplifying circuits. The segment end points define the low end and slopes of the specified number of segments, each of which can be associated with an amplifier. The value of the low end point of each segment can be used to determine the resistors to be used in a voltage divider at an input terminal of the amplifier, and the slope of the segment, which is the ratio between the difference in value of the end points of the segment and the number of divisions of the segment, is proportional to the desired gain, and thus the value of a gain control resistor, to be used with the amplifier.

What is claimed as new and desired to be secured by Letters Patent of the United States is:

1. A linear segment generating system for use in a system for generating a piece-wise linear continuous function comprising a selected fixed number of linear approximating segments, each defined by a low endpoint and a high endpoint, which approximate a predetermined function over a predetermined domain to within a selected error limit, the linear segment generating system generating the approximating segments and comprising:

A. initial segment generating means, said means including (i) means for generating a segment between the low segment endpoint and each successive point on said predetermined function, and (ii) means for testing, during each iteration, to verify that the error between the segment value and the value of said predetermined function at each point in the domain between the low endpoint and the point on said predetermined function is less than said selected error limit, the iterations stopping at the first iteration in which said difference is not less than said selected error limit, and the segment generated during said next previous iteration compriisng an initial segment; and B. extension segment generating means connected to said initial segment generating means (and), said means including (i) means responsive to said initial segment generating means generating an initial segment for iteratively generating linear extensions of the initial segment generated by said initial segment generating means and (ii) means operative during each iteration for testing each extension generated by said segment extension means to determine whether the error between the value of said extension and said predetermined function is less than the selected error limit, the iterations stopping at the first iteration in which said error is not less than said selected error limit, and the segment upper endpoint of said segment comprising the upper endpoint of said extension segment at the next previous iteration.

2. A linear segment generating system as defined in claim 1 wherein said initial segment generating means includes:

i. test segment generating means for iteratively generating a test segment between the respective low endpoint and each successive point on said predetermined function;

ii. initial segment test means connected to said test segment generating means and said error value storage means for testing each test segment generated by said test segment generating means to determine whether the error between the value of said test segment and said predetermined function is less than the selected error limit at each point between the low endpoint and the point on said predetermined function;

iii. initial segment control means connected to said test segment generating means and said test means for disabling said test segment generating means in response to said test means determining that the difference between the value of a test segment and the value of said predetermined function is greater than the specified error limit.

3. A linear segment generating system as defined in claim 2 wherein said extension segment generating means comprises:

i. segment extension means connected to said test segment generating means and said initial segment control means for iteratively generating divisional extensions of the last test segment generated by said test segment generating means in response to said initial segment control means disabling said test segment generating means;

ii. extension segment test means connected to said segment extension means for testing each extension generated by said segment extension means to determine whether the error between the value of said extension and said predetermined function is less than the specified error limit; and iii. extension segment control means connected to said segment extension means and said extension segment test means for disabling said segment extension means in response to said extension segment test means determining that the error between the value of said extension segment and the value of said predetermined function is greater than the specified error limit, the upper end of the segment being defined in response to the segment extension generated by said segment extension means when said extension segment control means disables said segment extension means.

4. A linear segment generating system as defined in claim 1 further comprising:

A. means for determining that it has identified endpoints defining the selected number of approximating segments; and B. means responsive to said determining means for iteratively testing the upper-most segment to verify that the error at each point between said segment and said predetermined function is less than said specified error limit.

5. A linear segment generating system for use in a system for generating a piece-wise linear continuous function comprising a selected fixed number of linear segments which approximate a predetermined function over a predetermined domain divided into a selected number of divisions defined by a plurality of endpoints equally spaced over said domain, the system including error value storage means for storing an error value and segment endpoint storage means for identifying the location of a segment low endpoint, the linear segment generating system determining the endpoints of the linear segments, thereby to define the approximating function, and comprising:

A. initial segment generating means comprising:

i. test segment generating means connected to said segment endpoint storage means for iteratively generating a segment between the location identified in said segment endpoint storage means and a point on said predetermined function;

ii. initial segment test means connected to said test segment generating means and said error value storage means for testing each test segment generated by said test segment generating means to determine whether the error between the value of said test segment and said predetermined function is less than the error value specified in said error value storage means at each division endpoint between the location specified in said segment endpoint storage means and the endpoint of said test segment generated by said test segment generating means;

iii. initial segment control means connected to said test segment generating means and said test means for disabling said test segment generating means in response to said test means determining that the error between the value of a test segment and the value of said predetermined function is greater than the error value specified in said error value storage means; and B. extension segment generating means comprising:

i. segment extension means connected to said test segment generating means and said initial segment control means for iteratively generating divisional extensions of the last test segment generated by said test segment generating means in response to said initial segment control means disabling said test segment generating means;

ii. extension segment test means connected to said segment extension means and said error value storage means for testing each extension generated by said segment extension means to determine whether the error between the value of said extension and said predetermined function is less than the error value specified in said error value storage means; and iii. extension segment control means connected to said segment extension means and said extension segment test means for disabling said segment extension means in response to said extension segment test means determining that the error between the value of said extension segment and the value of said predetermined function is greater than the error value specified in said error value storage means, the upper end of the segment being defined in response to the segment extension generated by said segment extension means when said extension segment control means disables said segment extension means.

6. A linear segment generating system as defined in claim 5 further comprising:

A. means for determining that it has identified endpoints defining the selected number of approximating segments; and B. means responsive to said determining means for iteratively testing the upper-most segment to verify that the error at each point between said segment and said predetermined function is less the error specified in said error value storage means.

7. A system for generating a piece-wise linear continuous function comprising a selected fixed number of linear segments for approximating a predetermined function over a predetermined domain divided into a selected number of divisions defined by a plurality of endpoints equally spaced over said domain, including:

A. error value storage means for storing an error value;

B. segment endpoint storage means for identifying the location of a segment low endpoint;

C. segment number counter means for identifying a segment number;

D. segment number storage means for receiving and storing said number of linear segments;

E. segment generating means including:

(a) initial segment generating means including:

i. test segment generating means connected to said segment endpoint storage means for iteratively generating a segment between the location identified in said segment endpoint storage means and a point on said predetermined function;

ii. initial segment test means connected to said test segment generating means and said error value storage means for testing each test segment generated by said test segment generating means to determine whether the error between the value of said test segment and said predetermined function is less than the error value specified in said error value storage means at each division endpoint between the location specified in said segment endpoint storage means and the endpoint of said test segment generated by said test segment generating means;

iii. initial segment control means connected to said test segment generating means and said test means for disabling said test segment generating means in response to said test means determining that the error between the value of a test segment and the value of said predetermined function is greater than the error value specified in said error value storage means; and (b). extension segment generating means comprising:

i. segment extension means connected to said test segment generating means and said initial segment control means for iteratively generating divisional extensions of the last test segment generated by said test segment generating means in response to said initial segment control means disabling said test segment generating means;

ii. extension segment test means connected to said segment extension means and said error value storage means for testing each extension generated by said segment extension means to determine whether the error between the value of said extension and said predetermined function is less than the error value specified in said error value storage means; and iii. extension segment control means connected to said segment extension means and said extension segment test means for disabling said segment extension means in response to said extension segment test means determining that the error between the value of said extension segment and the value of said predetermined function is greater than the error value specified in said error value storage means, the upper end of the segment being defined in response to the segment extension generated by said segment extension means when said extension segment control means disables siad segment extension means; and F. system control means connected to said extension segment control means, said segment number counter means and said segment number storage means for storing said upper end of said segment in said segment endpoint storage means, for incrementing said segment number counter means and for enabling said initial segment generating means if the value of said segment number counter means does not exceed the contents of said segment number storage means in response to said extension segment control means disabling said segment extension means.

8. A system as defined in claim 7 further comprising:
A. means for determining that it has identified endpoints defining the selected number of approximating segments; and
B. means responsive to said determining means for iteratively testing the upper-most segment to verify that the difference at each point between said segment and said predetermined function is less the error specified in said error value storage means.

9. A system as defined in claim 8 further comprising means for adjusting the contents of said error value storage means in response to successful and unsuccessful tests by said determining means.

10. A system as defined in claim 9 further comprising loose error storage means, tight error storage means, and error value saving means including:
A. loose error saving means responsive to each successful test by said determining means for copying the contents of said error value storage means into said loose error storage means, and
B. tight error saving means responsive to each unsuccessful test by said determining means for copying the contents of said error value storage means into said tight error storage means.

11. A system as defined in claim 10 further comprising
A. binary search testing means responsive to the operation of said error value saving means for testing the contents of both said loose error storage means and said tight error storage means to determine whether both have non-zero contents; and
B. binary search enabling means responsive to said binary search testing means for adjusting the contents of said error value storage means in response to the contents of said loose error storage means and said tight error storage means and for enabling said segment generating means to generate segments in response to the contents of said error value storage means.

12. A system as defined in claim 11 further comprising termination criteria means for defining termination criteria and termination test means responsive to said binary search enabling means and said segment generating means for performing a selected test on the segments generated by said segment generating means and for disabling said binary search means in response to the segments meeting a termination criterion defined by said termination criteria means.

13. A method for approximating a predetermined fixed non-linear function over a predetermined fixed domain with a predetermined number of straight line segments, the domain being divided into a selected number of divisions with defined ends, there being a point on the function for each of said defined ends, said function having a beginning point and an end point; the method comprising the steps of:
A. generating a straight line segment connecting the beginning point to a selected point on the function;
B. determining the error between the point on the function and a point on the generated line segment at each division end between the ends of the generated line segment;
C. testing each determined error against a selected error limit;
D. if none of the determined errors exceeds the selected error limit, repeating steps A through C with the selected point being a point further along the function;
E. iteratively repeating steps A through D, with the selected point being advanced along the function for each iteration, until, during step C, a determined error exceeds the selected error limit;
F. when, during an iteration, a determined error exceeds the selected error limit, selecting the line segment generated during the preceding iteration;
G. extending the selected line segment to successive defined ends;
H. determining the error between the point on the function and the point on the extended line segment at each of said successive defined ends;
I. testing each determined error against the selected error limit;
J. terminating the line segment at the point thereon prior to the point where the error limit is exceeded;
K. utilizing the termination point of a line segment as the beginning point for a succeeding line segment; and
L. repeating steps A through K for succeeding line segments.

14. A method as claimed in claim 13 wherein steps A through I are performed for each of the predetermined number of line segments except the last segment; and including the steps of
M. generating a straight line segment connecting the termination point of the next-to-last line segment to said endpoint;
N. determining the error between the point on the function and a point on the generated line segment at each division end between the ends of the generated line segment; and
O. testing each determined error against the selected error limit.

15. A method as claimed in claim 14 including the steps performed if during step O a determined error is found which exceeds the selected error limit of selecting a new, less stringent error limit; and
repeating steps A through O using the new error limit.

16. A method as claimed in claim 14 including the steps performed if during step O no determined error is found which exceeds the selected error limit, of:
testing the generated segments against defined termination criteria;
terminating the operation if the termination criteria are satisified;
if the termination criteria are not satisfied, selecting a new, more stringent error limit; and
repeating steps A through O using the new error limit.

17. A method as claimed in claim 13 wherein, during step A, the selected point on the function is the second point after the beginning point; and
wherein, during step D, the selected point further along the function is the point on the function following the previously used selected point.

* * * * *